United States Patent

Condolios et al.

[11] 3,923,652
[45] Dec. 2, 1975

[54] METHOD AND APPARATUS FOR COMPACTING FLUID SLUDGES

[75] Inventors: Elie Condolios; Michel Merle, both of Grenoble, France

[73] Assignee: Societe Generale de Constructions Electriques et Mecaniques (ALSTHOM), France

[22] Filed: Nov. 28, 1973

[21] Appl. No.: 419,713

[30] Foreign Application Priority Data
Nov. 28, 1972 France .............................. 72.42253

[52] U.S. Cl. .................. 210/67; 210/112; 210/208; 210/528; 210/533
[51] Int. Cl.[2] ............................................ C02C 3/00
[58] Field of Search ............ 210/10, 66, 67, 49, 83, 210/84, 86, 104, 109, 112, 199, 200, 208, 219, 521, 528, 533, 20, 207; 100/117, 140–145

[56] References Cited
UNITED STATES PATENTS

| | | | |
|---|---|---|---|
| 2,964,179 | 12/1960 | Loevenstein et al. | 210/83 |
| 3,473,661 | 10/1969 | Duff | 210/528 |
| 3,523,889 | 8/1970 | Eis | 210/112 |
| 3,635,346 | 1/1972 | Zuckerman et al. | 210/208 |
| 3,660,284 | 5/1972 | Camp | 210/49 |
| 3,679,053 | 7/1972 | Koulovatos | 210/86 |
| 3,687,288 | 8/1972 | Lynch et al. | 210/112 |

*Primary Examiner*—Thomas G. Wyse
*Assistant Examiner*—Peter A. Hruskoci
*Attorney, Agent, or Firm*—Craig & Antonelli

[57] ABSTRACT

Method for compacting fluid sludges, consisting in stirring mechanically the sludges slowly by means of perforated blades rotating at low speed in a tank and in extracting them from the said tank by pressing by means of a perforated conical screw rotating slowly in a conical housing.

31 Claims, 3 Drawing Figures

METHOD AND APPARATUS FOR COMPACTING FLUID SLUDGES

Industries often pour away water or liquids laden with very fine mineral substances, finer than a few hundredths of a micron. These fine mineral substances are generally very difficult to decant and numerous methods are at present used for clarifying these liquids or that water with a view to decanting them or to using them again.

All the methods presently known enable on the one hand clarified liquids, and, on the other hand, sludges containing mineral substances, to be obtained. These sludges are generally fairly fluid and, depending on the mineral substances they contain, the floculation and clarifying method used, their concentration varies between a minimum of a few tens of grams per liter of sludge to a maximum comprised between 300 and 500 grams per liter. Sludges in that state can in no way be handled by classical means of transport: trucks, wagons, conveyor belts, etc. They must be arranged in vats, lagoons or tanks where it is necessary to wait for a more or less long time to obtain the settling thereof, which time may vary between a few months and several years.

When certain industries need to obtain these sludges in a more compact form rapidly, they use methods which have been known for a long time, such as:

1. Compacting on press filters, that is, forcing the sludge to pass through a filter made of cloth with very fine stitches so as to allow the water to pass and the mineral substances to be retained on the filter;

2. Compacting by centrifuging, that is, centrifuging the sludges in a bowl rotating at very high speed so as to compact all the mineral substances against the bowl. The water in the central part of the bowl is discharged by appropriate means.

Other methods which are less effective or less widely known exist, but all of them afford numerous disadvantages, great investments, difficult and expensive maintenance, and great energy expended per ton of sludge treated.

Before describing the method which is the object of this invention, it would be useful to mention a few general details on what characterizes the expression sludge used in this description. When the quantity of dry solid substance is slight in water or in the carrier liquid, in the order of or less than 1 to 2 grams per liter, dirty water or a dirty liquid is referred to. When the concentration exceeds a few tens of grams per liter to reach 100 grams per liter, sludgy water is referred to. With higher concentrations than these, of a few hundreds of grams per liter and depending on the rheological characteristics of the sludges, a pasty sludge is then referred to.

Moreover, generally, when the weight of liquid contained in the sludges becomes less than that of the solid substances, the sludges pass to the pseudo-solid state. Clods of earth or clods of clay are then referred to, according to the dry substances which constitute them.

A few notions on floculation should also be mentioned in order to better understand the method. When the fine solid substances are dispersed in water or a liquid, it generally takes too long to let them simply decant. It is an advantage to pour into the liquid certain products: mineral salts, organic floculating substances or synthesizing substances so as to group together the fine solid substances dispersed in the form of agglomerations of grains, larger than the unitary grains, so as to speed up decanting. Flakes have then been formed in the carrier liquid and the primary floculation phenomenon has hence been started up.

If floculating agents which are the best adapted to the particular substance are added to the liquid in which the primary floculation has been started up, these first fine agglomerated substances or small flakes which are not very solid and not very dense are gathered together into large flakes. A second floculation phenomenon called secondary floculation is then obtained.

These large flakes which are more solid, and more dense, are decanted rapidly to constitute a non-homogenous sludge formed by large very hydrophobous flakes each retaining its unity, with, between each flake, clear interstitial liquid or water.

The invention consists, after having effected the primary and secondary floculation described above, in effecting a slight controlled stirring of the sludges with a view to ensuring the settling thereof and then in extracting them in a very well defined way with a view on the one hand to the removal of water or liquid which remains between the clods of settled sludge and, on the other hand, to the removal of the damp solid substances to be scavenged.

According to the invention, the controlled stirring of the sludge is effected mechanically, slowly, at all points, by inclined blades placed judiciously in the tank containing the sludges and formed with holes which are well determined for obtaining the settling of the flakes of sludge, the sludges thus settled being extracted through the bottom of the tank, by a perforated conical screw rotating slowly in a conical recess whose point, constituting the sludge outlet orifice, is directed downwards, so that the discharge of sludge decreases as the extraction orifice of the device is approached, so as to send the interstitial liquid which is between the flakes back towards the top and to make the latter come out in a compact mass towards the orifice. The tank may comprise one or several conical screws for extracting and the drive of the conical screws for extracting may be common to that of the mechanical stirring blades or distinct therefrom.

Mechanical stirring may comprise one or several rows of blades and two or several blades per row and may be distributed throughout the tank as a whole if the latter has large dimensions.

Moreover, the extracting of compacted sludges could be controlled by the level of sludge in the tank.

Several embodiments for implementing the method according to the invention are given hereafter by way of examples, with reference to the accompanying figures wherein.

Figure 1:
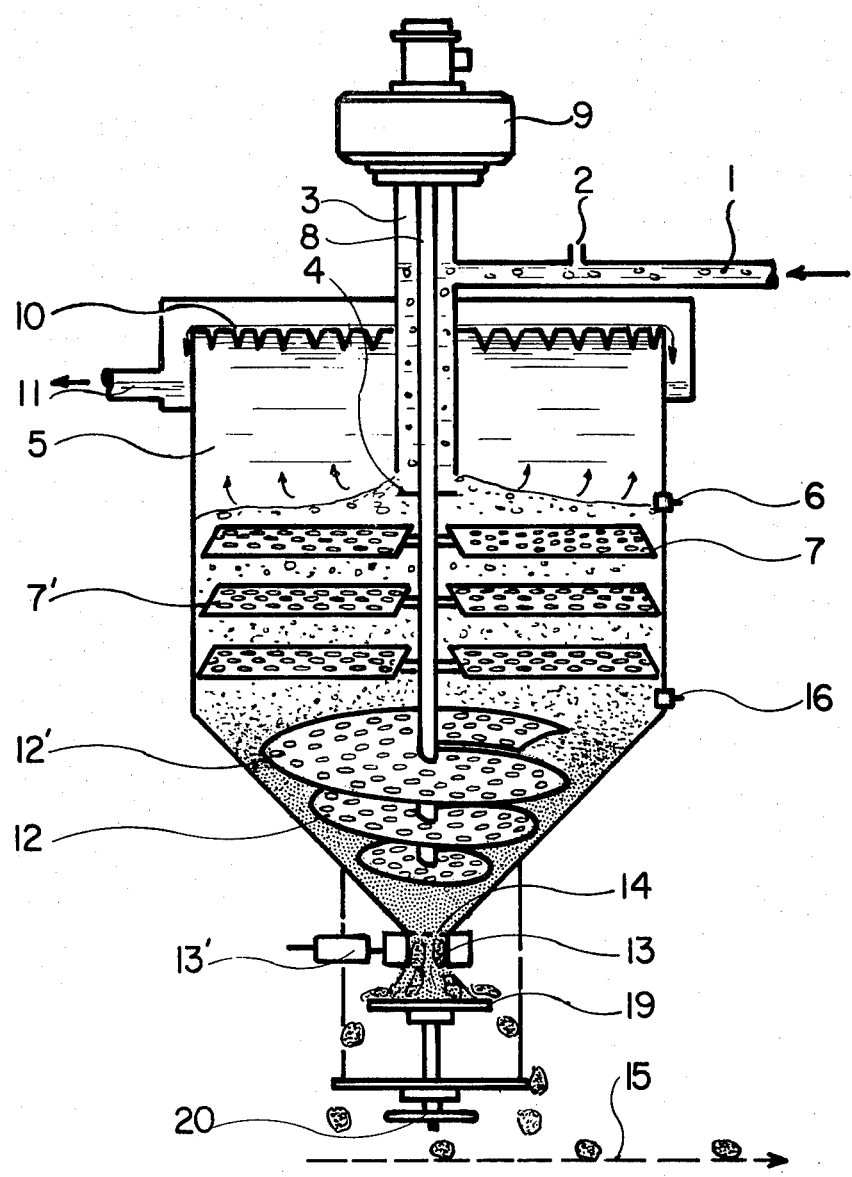
FIG. 1 is a vertical sectional view of a device according to the invention.

With reference to FIG. 1, the sludges, after a preliminary primary and secondary floculation treatment by the known methods referred to above in the discussion of the prior art, are inserted into a device according to the invention by a tube 1.

The large flakes which have been formed during primary and secondary floculation operations are partly destroyed by the passing in the tube 1 due to the speed required for the transfer of the sludge into the device.

To enable the reconstituting of the flakes and to speed up the settling thereof, a floculation agent which is generally a synthesizing polymer, called a settling floculation agent, is inserted at a point 2 on the tube.

At the inlet of the tube 3, the settling floculation agent gathers together the flakes which are more or less broken by their hydraulic transfer in the tube 1 to form again large flakes which go down the tube 3 towards a distribution deflector 4 placed at the bottom of that tube. That deflector 4 separates the clear liquid from the large flakes which it contains in a tank 5. The large flakes are then deposited on the bottom of the tank and the liquid and the water which are practically clear rise towards spillway 10 of the tank 5 and are decanted in a regular way by V-shaped channels placed on the spillway to be discharged by the scavenging spout 11.

The flakes which have been deposited on the bottom of the tank are then pushed by a series of blades 7 rotating slowly in the tank. These blades are driven by a shaft 8 and a speed reducing motor 9 enabling the required speed to be obtained.

One of the important points of the invention is that it is necessary to:

1. Stir the flakes at a slow speed so as not to break them up; that maximum speed must not exceed ten or so centimeters per second at the fastest point of the blades;
2. The blades must be more or less inclined according to the type of flakes formed so as to cause slow movements of the sludges enabling, by the pressure of the blades on the flakes, the distance between the unitary flakes to be reduced, the dimension of these flakes and their density to be increased and the clear liquid or water contained in the flakes to be extracted;
3. The blades will generally be provided with holes 7' whose dimension will be comprised between a few millimeters and 1 or 2 centimeters. The existence of these orifices enables the liquid to go out through the rear portion of the blade and to be discharged upwards. The settled flakes remaining at the front of the blade to be pressed by the mechanical action of the latter downwards;
4. The device may comprise at least two blades per level, but that number has no limiting character; and
5. The device may comprise at least one level of blades but several levels are generally necessary to obtain totally the desired effect.

The flakes which have thus been enlarged and have settled in the central zone of the tank 5 move down towards the cylindro-conical zone placed at the bottom of that tank. The flakes are then taken up again by a conical screw 12 comprising holes 12' which push them slowly towards the orifice 13 placed at the bottom of the conical part of the tank 5. That conical screw 12 may be controlled by the same shaft 8 and the same speed reducing motor unit 9 such as shown in FIG. 1, either by another shaft concentric with the first, driven by the same gear speed reducing motor 9, or by another drive unit. The latter arrangement enables a rotation speed from that of the conical screw different from that of the presettling blades 7 to be obtained.

That arrangement is also one of the important points of the invention, for it is necessary to give the conical screw a rate such that the discharge of the sludge discharged by the screw decreases as progress is made towards the orifice 13. This particular arrangement enables the flakes to settle completely and the water or liquid still contained between the flakes to be discharged towards the top of the conical screw. It is also necessary to place on the conical screw holes having dimensions close to those of the blades 7 so as to enable the water or liquid to rise more easily towards the top of the tank 5 and to obtain a low conical screw speed which never exceeds that of the pre-settling blades 7.

The flakes which have completely settled at the bottom of the screw obstruct completely the orifice 13 and prevent any pouring out of liquid towards the bottom. Under the mechanical action of the screw 12, these settled flakes have gathered together to form a very compact mass which pours out through the orifice 13 to be removed by classical means 15 (conveyor belt, lorry, wagon).

The orifice 13 is provided with a grill 14 having hole dimensions chosen according to the sludges and comprises a variable cross section adjusted by the height of the sludge in the tank 5. A plate 19 which may be adjusted for height by means of a control device 20 is placed beneath the orifice 13 in order to maintain a continuous mass of sludge at the outlet of the extraction orifice to avoid the driving out of water through cracks which may exist in the sludges.

To obtain a normal operation of the device described, taking into account the fact that the discharge of the sludge inserted in the tube 1 is generally variable, a minimum sludge level detector 16 and a maximum sludge level detector 6 will be placed on the tank 5. If the level of sludge is found to be below the detector 16, it is necessary either to reduce the speed of the conical screw 12 or to even stop that screw for a more or less long time so that the level may rise above the detector, or to reduce the cross section of the orifice 13 by suitable means, such as closing device 13' controlled by the detector. If the sludge level increases too much and exceeds the detector 6 which is generally placed at the height of the deflector 4, it is necessary to increase either the speed of the conical screw 12 without ever exceeding the maximum permissible speeds, or to increase the dimension of the orifice 13 or both. If, at the limit of the speed possibilities of the conical screw 12 and of the diameter of the orifice 13 the level of the sludge exceeds the level 6, it is then necessary to reduce the discharge of the sludge to be treated which is admitted in the tube 1.

Figure 2:
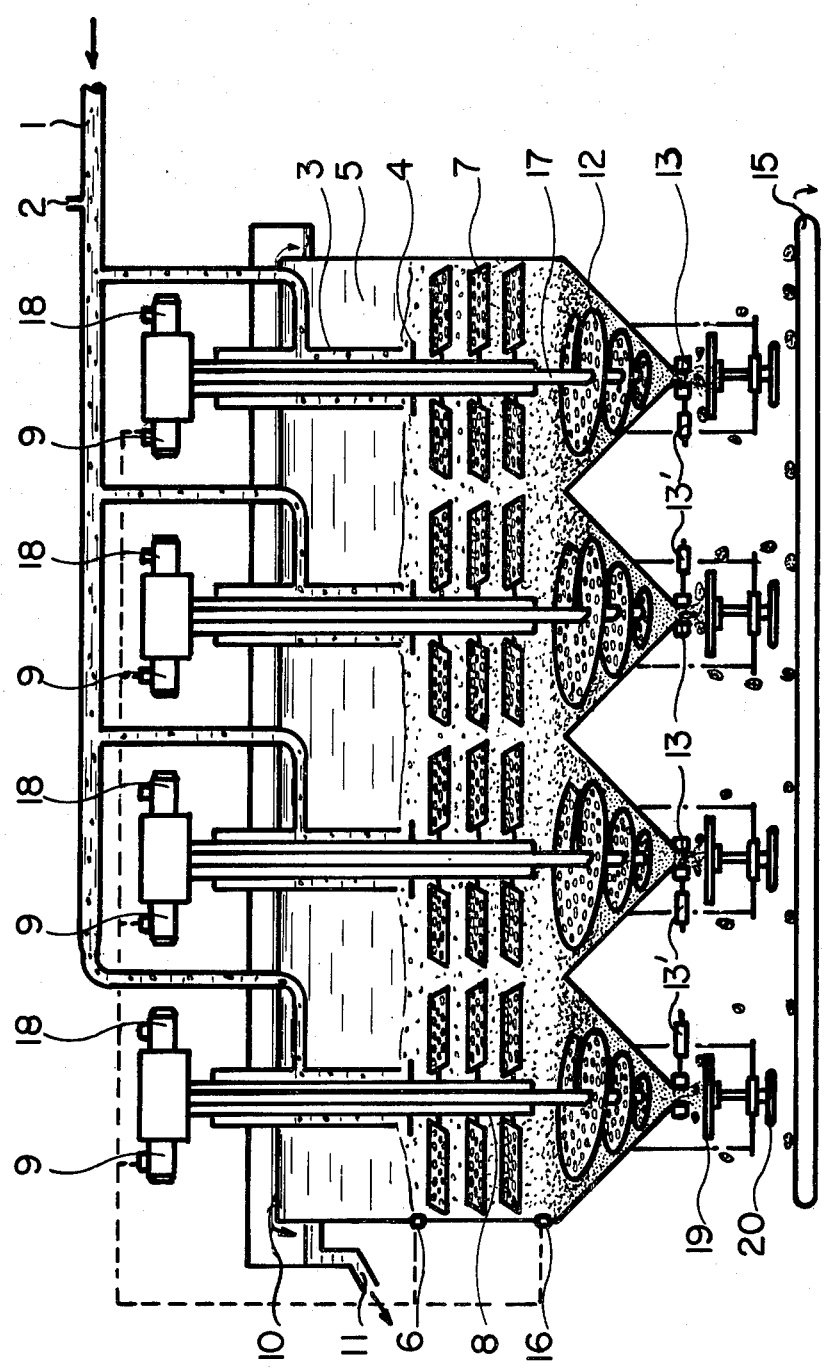
FIG. 2 is an axial sectional view of a multiple device.

FIG. 2 shows another arrangement in accordance with a high discharge method operating on the same principle. In that arrangement, the fluid sludge to be treated obtained after primary and secondary floculation is inserted by the tube 1, the settling floculation agent being inserted at 2. The sludge is distributed in four tubes 3 each having a deflector 4. The number of tubes may be random and may depend on the discharge to be treated. The sludge is distributed evenly in the single tank 5 for all the wells.

At the bottom of the tank 5 and in the axis of each tube 3, it will be observed that there is a cylindrico-conical bottom which is connected to the walls of the tank 5. In the case shown in FIG. 2, it will be observed that there are four cones each having at their bottom a nozzle 13. In each tube 3 there is a hollow shaft 8 which comprises three rows of blades 7 with holes which rotate slowly at a maximum speed less than ten or so centimeters per second. Each shaft 8 is driven by the speed reducing motor unit 9.

The water or liquid extracted from the flakes by the action of the blades 7 rises to the top of the tank 5, is decanted over the spillway 10 and is discharged by the duct with an orifice 11. The pre-settled sludge is sent to the cones placed at the bottom of the tank 5. Perforated worm screws 12 having a conical shape compress the sludge and extract it in the form of clods 14 through the holes 13. These clods are drawn away by a removal belt 15. Each conical screw 12 is driven by the shaft 17 which may rotate at a different speed in the hollow shaft 8. Each shaft 17 is driven by the speed reducing motor 18. When the sludge level is below the detector 16 the latter stops the speed reducing motor unit 9 and stops the extraction screws 12, the blades 7 continuing to rotate at the speed defined. When the sludge level rises and reaches the detector 6, the latter sets off the starting up of the extraction screws 12 to remove the settled sludge.

Figure 3:
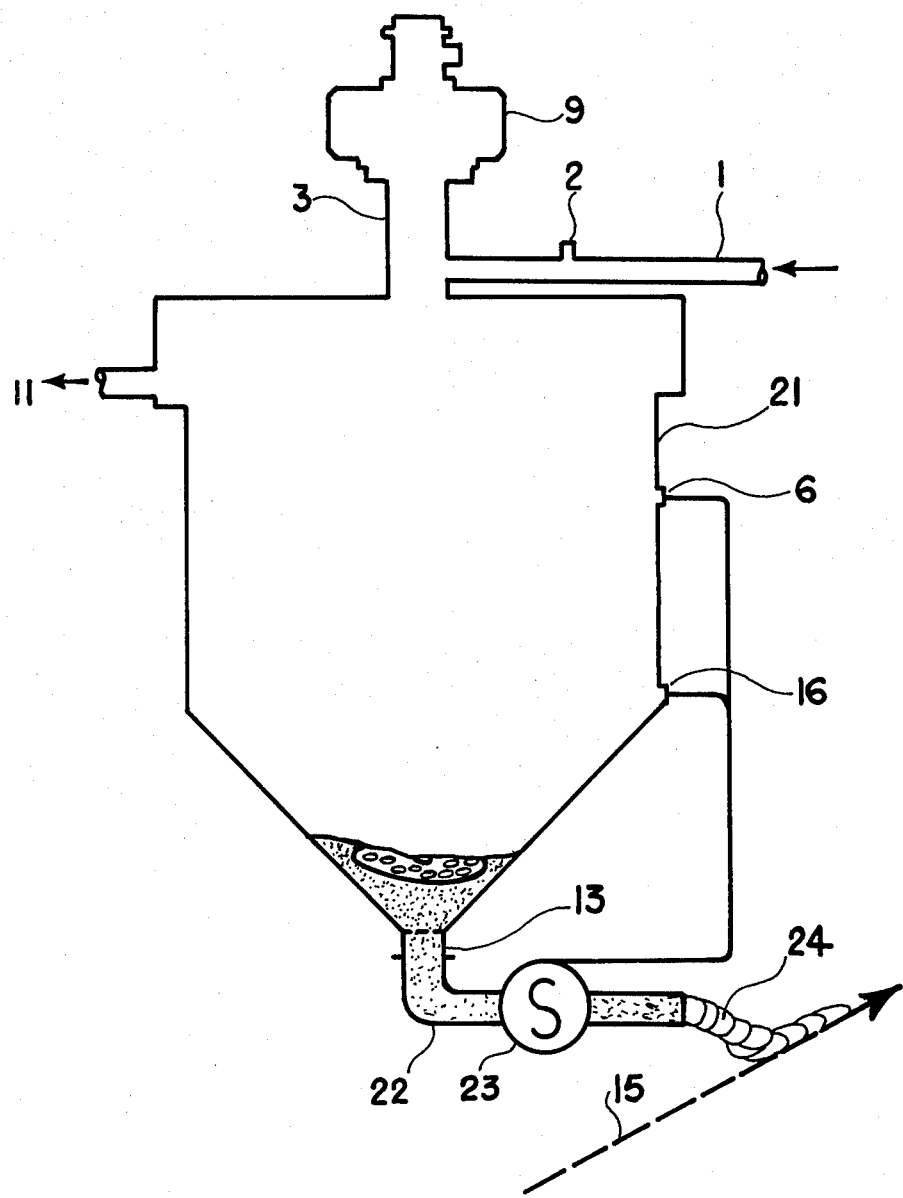
FIG. 3 is a partial sectional view of a modified embodiment of the invention.

FIG. 3 shows a variant of the invention applicable to the embodiments in FIGS. 1 and 2 in which the extraction of the compacted sludge is effected by means of a volumetric pump. That figure shows the body 21 of the device in FIG. 1 with the inlet for the sludges through the tube 1, the inlet of the settling flocculation agent at 2, the tube 3 for insertion in the device, the motor 9 for driving the blades within the device and the level detectors 6 and 16.

The device is cut away axially at its lower part, so that the orifice 13 for the outlet of the compacted sludges may be seen. In that variant, that orifice 13 is provided with a tube 22 connected to a volumetric extraction pump 23 whose rotation speed, that is, whose discharge is controlled by the level detectors 6 and 16. A piston type volumetric pump controlled by these same detectors 6 and 16 could, of course, be used.

It will be seen that the discharge of such a pump is independent from the consistency of the sludge at the outlet 13 of the device and that the discharge control ensured by the level detectors 6 and 16 is maintained. This property is of great interest, particularly in the case where sludges having very variable consistency are to be treated or if the flocculation inside the device is insufficient, giving rise to sludges which are too liquid at the outlet of the device whose extraction discharge through the bottom orifice may increase too much, this being able, without that controlled discharge condition imposed by the pump 23, to empty the device.

The compacted sludge 24 is removed by the pump onto a conveyor belt 15. On the stopping thereof controlled manually or by the level detectors 6 and 16, that pump blocks automatically the extraction of the sludge. That pump is chosen such that it has a slow rotation speed, in order not to modify the structure of the sludge and to keep it in as compact a state as possible.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. A method for compacting fluid sludge including flakes of sludge smaller than a few tenths of a millimeter and an interstitial liquid, said method comprising: introducing fluid sludge into a tank; separating a portion of the interstitial liquid from said fluid sludge to produce a concentrated sludge; stirring said concentrated sludge slowly so that the flakes of sludge in said concentrated sludge increase in volume and density, stirring being accomplished by means of a plurality of inclined perforated blades mounted for rotation about a vertical shaft, the stirring speed being so chosen that break up of flakes of sludge is substantially prevented; pressing the flakes of sludge which have been stirred toward a discharge point so that movement of the flakes of sludge decreases as said discharge point is approached, so that the interstitial liquid between the flakes of sludge is moved away from said discharge point, and so that the flakes of sludge are compacted, pressing being accomplished by at least one perforated conical screw mounted for rotation about a vertical shaft and positioned below said perforated blades; and removing the compacted sludge flakes at said discharge point, said perforated blades being inclined so as to push said flakes of sludge towards said conical screw.

2. The method of claim 1, wherein interstitial liquid moving away from said discharge point as the sludge flakes are pressed moves upwardly through said tank.

3. The method of claim 1, further comprising adding a flocculating agent to said fluid sludge prior to separating a portion of the interstitial liquid therefrom so that sludge flakes undergo flocculation prior to the separation of a portion of said interstitial liquid therefrom.

4. The method of claim 3, wherein flocculation is accomplished in a chamber free of means for mixing said fluid sludge.

5. The method of claim 1, wherein the stirring speed is so chosen that the maximum speed of any part of the stirring means used to effect stirring is no more than about 10 cm/sec.

6. The method of claim 1, wherein said perforated blades are horizontally disposed.

7. A device for compacting fluid sludge comprising a cylindrico-conical tank, means defining a flocculation chamber in said cylindrico-conical tank, said flocculation chamber having an outlet in said cylindrico-conical tank, inlet means for transferring fluid sludge to be treated into said flocculation chamber, deflector means positioned at the outlet of said flocculation chamber for producing a concentrated sludge, stirring means for stirring the concentrated sludge so that the flakes of sludge in said concentrated sludge increase in volume and density, the stirring means being disposed in the cylindrical part of said tank below said flocculation chamber and comprising a plurality of inclined perforated blades mounted on a vertical shaft, compacting means located in the conical portion of said tank for compacting sludge and for discharging compacted sludge from an opening in the lower part of said cylindrico-conical tank, said compacting means comprising at least one perforated conical screw mounted on a vertical shaft and positioned below said perforated blades, means for removing clarified liquid from an upper portion of said cylindrico-conical tank, said perforated blades being inclined so as to push said flakes of sludge towards said conical screw, and drive means for rotating said blades and said perforated conical screw.

8. Device according to claim 7, further including level detector means mounted on said tank for controlling said drive means in accordance with the level of sludge in said tank to regulate the rotation of said conical screw.

9. Device according to claim 8, characterized in that said level detector means controls the rotation speed of both said blades and said conical screw.

10. Device according to claim 8, further including means responsive to said level detector means for controlling the cross section of the outlet orifice, thereby controlling the discharge of the compacted sludges.

11. Device according to claim 8, characterized in that said outlet orifice for discharging the compacted sludges is connected to a volumetric extraction pump whose discharge is controlled by said level detector means.

12. Device according to claim 8, characterized in that an adjustable horizontal plate adjustable for height is arranged below and at a slight distance from the outlet orifice for the compacted sludge and means is provided for adjusting the height of said horizontal plate.

13. Device according to claim 7, further comprising a first control device for controlling the rotation of said blades and a second control device for controlling the rotation of the conical screw, said first and second control devices being distinct from each other.

14. Device according to claim 7, characterized in that the rotating blades are arranged in several superimposed rows, each row comprising at least two blades.

15. Device according to claim 7, further comprising an inlet duct for the sludge to be treated, said inlet duct being provided with a second inlet for flocculation agents.

16. The device of claim 7, wherein said screw and said perforated blades are mounted for rotation about a common axis.

17. The device of claim 7, further comprising means for controlling the flow of compacted sludge passing out of said outlet.

18. The device of claim 17, wherein said means for controlling is responsive to the level of compacted sludge in said cylindrical-conical tank.

19. The device of claim 18, wherein the rotation of said screw and said stirring means is controlled by said means for controlling.

20. The device of claim 7, wherein said perforated blades are horizontally disposed.

21. Device for compacting fluid sludge containing fine substances comprising a tank, an inlet duct for conveying the sludges to be treated, several tubes each leading into said tank at spaced points and being connected to said inlet duct, a deflector positioned at about half the height of the tank at the outlet of each tube, a plurality of groups of perforated blades mounted for rotation about a respective vertical axis and being disposed in said tank below each deflector, a plurality of conical perforated screws each mounted for rotation about a vertical axis below a respective group of rotating blades in a respective one of a plurality of conical recesses at the base of said tank, each conical recess comprising at its lower end an outlet orifice for discharging the compacted sludge, the top end of said tank comprising spillway means for the removal of the fluid contained in the sludge, and drive means for rotating said blades and said conical screws, said perforated blades being inclined so that each group of perforated blades pushes flakes of sludge towards the respective conical screw.

22. Device according to claim 21, further including level detector means mounted on said tank for controlling said drive means in accordance with the level of sludge in said tank to regulate the rotation of said conical screws.

23. Device according to claim 22, characterized in that said level detector means controls the rotation speed of both said blades and said conical screws.

24. Device according to claim 22, further including means responsive to said level detector means for controlling the cross section of at least one outlet orifice, thereby controlling the discharge of the compacted sludge.

25. Device according to claim 22, characterized in that at least one outlet orifice for discharging the compacted sludge is connected to a volumetric extraction pump whose discharge is controlled by said level detector means.

26. Device according to claim 22, characterized in that an adjustable horizontal plate adjustable for height is arranged below and at a slight distance from at least one outlet orifice for the compacted sludge and means is provided for adjusting the height of said horizontal plate.

27. Device according to claim 21, characterized in that each group of blades and the respective conical screw are mounted for rotation on a common shaft.

28. Device according to claim 21, characterized in that said drive means includes a first control device for controlling the rotation of the blades and a second control device for the rotation of the blades and a second control device for the rotation of the conical screws, said first and second control devices being distinct from each other.

29. Device according to claim 21, characterized in that the rotating blades of each group are arranged in several superimposed rows, each row comprising at least two blades.

30. Device according to claim 21, characterized in that said inlet duct for the sludge to be treated is provided with a second inlet for flocculation agents.

31. The device of claim 21, wherein said perforated blades are horizontally disposed.

* * * * *